(12) United States Patent
Paterour et al.

(10) Patent No.: US 11,343,689 B2
(45) Date of Patent: May 24, 2022

(54) METHOD FOR SUPERVISING THE CONNECTION BETWEEN TWO NODES OF A COMMUNICATION NETWORK

(71) Applicant: AIRBUS DS SLC, Elancourt (FR)

(72) Inventors: Olivier Paterour, Guyancourt (FR); Pascal Laffitte, Sainte Geneviève des Bois (FR)

(73) Assignee: AIRBUS DS SLC, Elancourt (FR)

( * ) Notice: Subject to any disclaimer, the term of this patent is extended or adjusted under 35 U.S.C. 154(b) by 115 days.

(21) Appl. No.: 16/859,194

(22) Filed: Apr. 27, 2020

(65) Prior Publication Data
US 2020/0344624 A1   Oct. 29, 2020

(30) Foreign Application Priority Data

Apr. 25, 2019  (FR) ........................................ 1904393

(51) Int. Cl.
*H04W 24/08*   (2009.01)
*H04W 4/90*    (2018.01)
*H04W 4/06*    (2009.01)

(52) U.S. Cl.
CPC ............. *H04W 24/08* (2013.01); *H04W 4/06* (2013.01); *H04W 4/90* (2018.02)

(58) Field of Classification Search
CPC ......... H04W 24/08; H04W 4/90; H04W 4/06; H04W 4/08; H04W 12/06; H04W 24/04; H04L 67/14
See application file for complete search history.

(56) References Cited

U.S. PATENT DOCUMENTS

| | | | | |
|---|---|---|---|---|
| 2007/0280256 A1* | 12/2007 | Forslow | ................ | H04L 67/145 370/395.2 |
| 2018/0242120 A1* | 8/2018 | Baek | ..................... | H04W 12/08 |
| 2019/0028551 A1* | 1/2019 | Qiao | .................. | H04L 67/1002 |

OTHER PUBLICATIONS

3GPP, "Study on application architecture for the Future Railway Mobile Communication System", Jan. 2018, 3GPP. (Year: 2018).*
French Search Report as issued in French Patent Application No. 1904393, dated Oct. 24, 2019.
"Solution on floor grant for multi-talker feature," Nokia, 3GPP TSG-SA WG6 Meeting #18, S6-170878, Jul. 2017, Retrived from the Internet: URL:http://www.3gpp.org/ftp/Meetings_3GPP_SYNC/SA6/Docs/, XP051311260, 3 pages.
"Floor control corrections," Samsung Electronics, 3GPP TSG-CT WG1 Meeting #97, C1-162838, Jun. 2016, Retrieved from Internet: URL:http://www.3gpp.org/ftp/Meetings_3GPP_SYNC/CT/Docs/, XP051100232, 21 pages.
"Update of MCPTT TC 7.1.1.1," U.S. Department of Commerce, 3GPP TSG-RAN-WG5 Meeting #77, R5-176269r1, Nov. 2017, Retrieved from the Internet: URL:http://www.3gpp.org/ftp/tsg%5Fran/WG5%5FTest%5Fex%2DT1/Intermediate%5FMeeting%5FDocuments/TSGR5%5F77/, XP051376371, 35 pages.

(Continued)

*Primary Examiner* — Peter P Chau
(74) *Attorney, Agent, or Firm* — Pillsbury Winthrop Shaw Pittman LLP

(57) ABSTRACT

A method for monitoring the connection between a first node and a second node of a communication network, includes selecting a session established between the first node and the second node, the selected session becoming a monitoring session, monitoring the connection between the first node and the second node via the monitoring session.

9 Claims, 4 Drawing Sheets

(56) References Cited

OTHER PUBLICATIONS

"Off-network—Floor queue position," Samsung, 3GPP TSG-CT WG1 Meeting #96, C1-161218, Feb. 2016, Retrieved from the Internet: URL:http://www.3gpp.org/ftp/tsg_ct/WG1_mm-cc-sm_ex-CN1/TSGC1_96_Jeju/docs/, XP051078143, 4 pages.

* cited by examiner

[Fig. 1] PRIOR ART
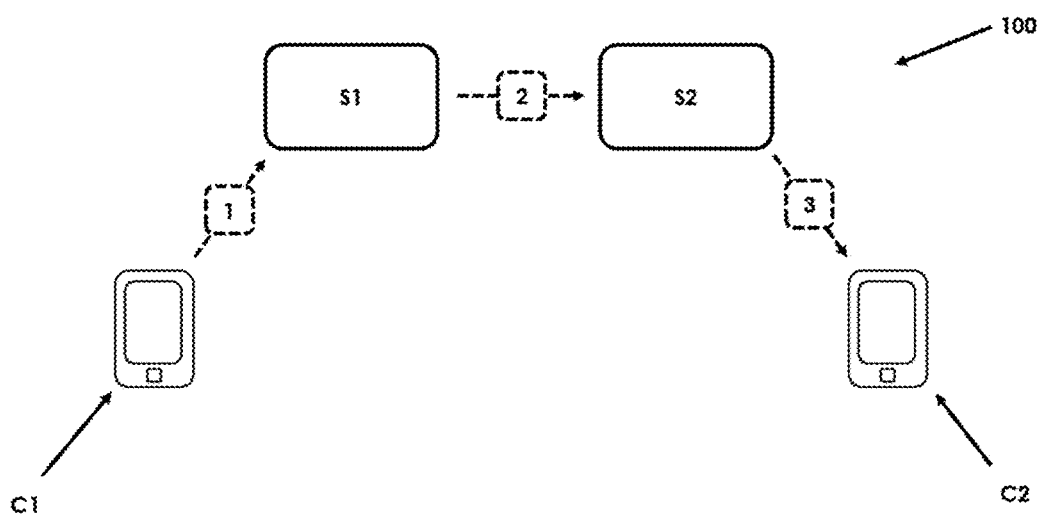
[Fig. 2]
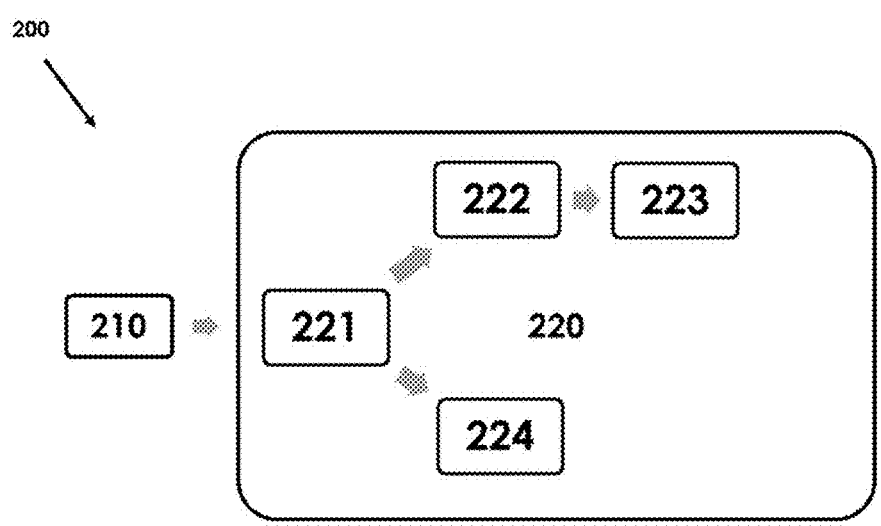

[Fig. 3]
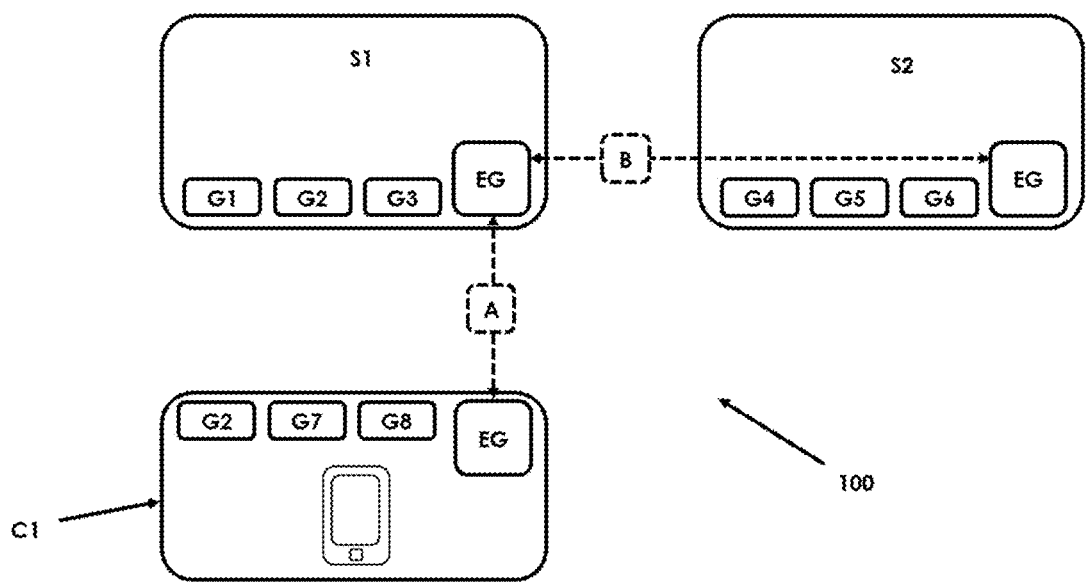
[Fig. 4]
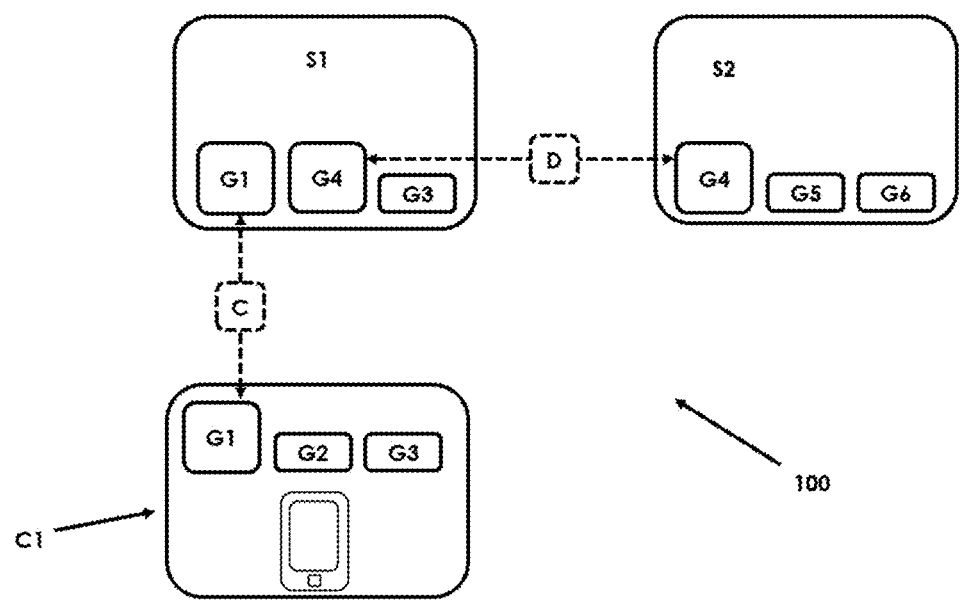

[Fig. 5]
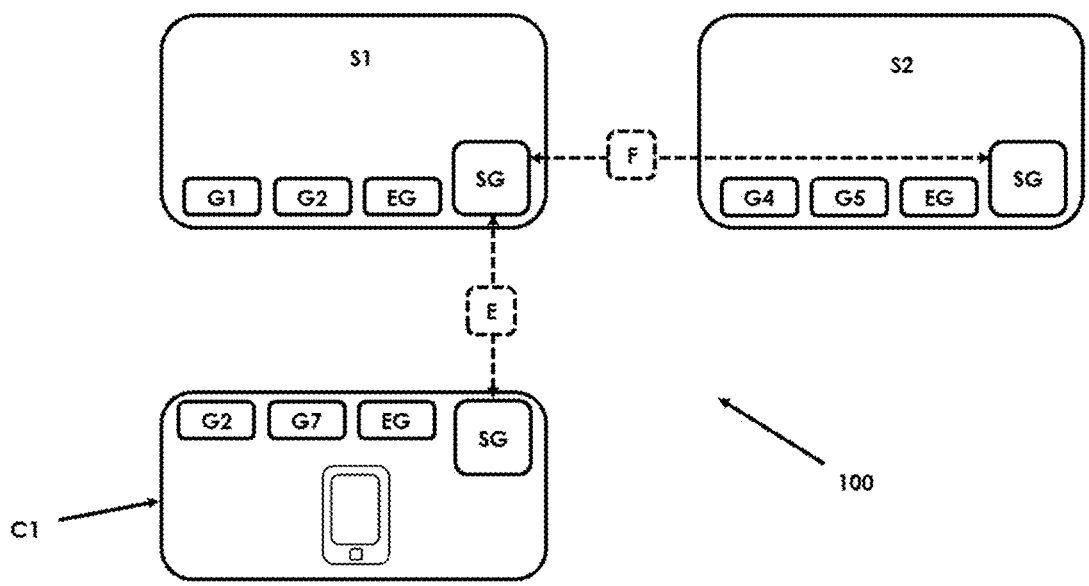
[Fig. 6]
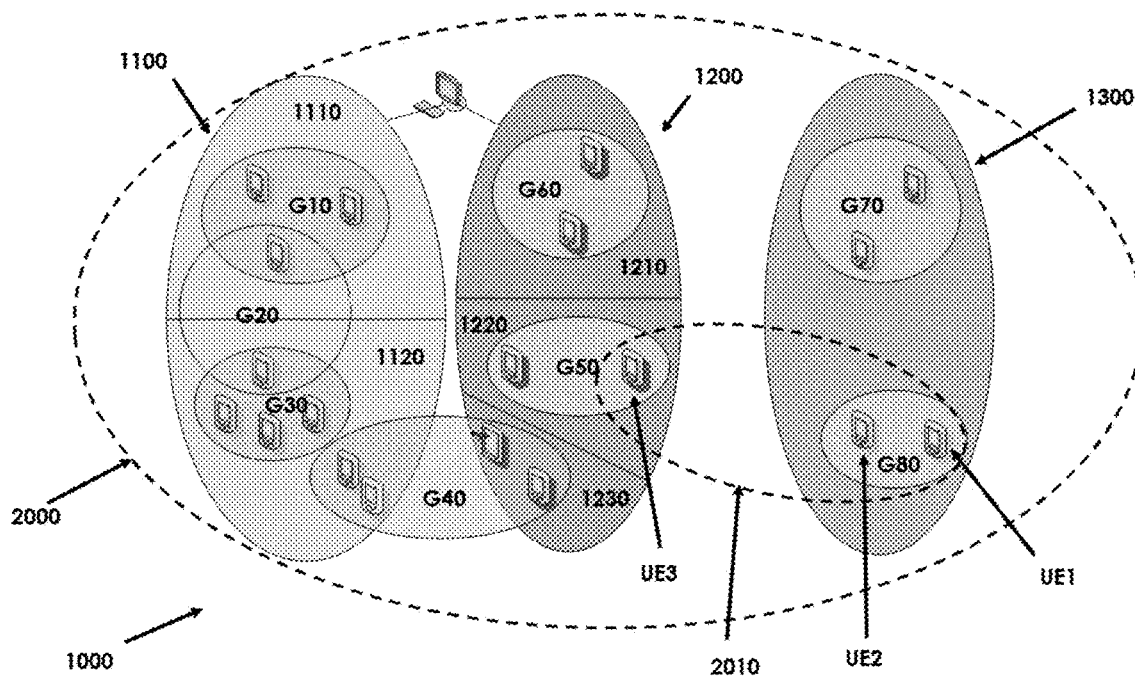

[Fig. 7]
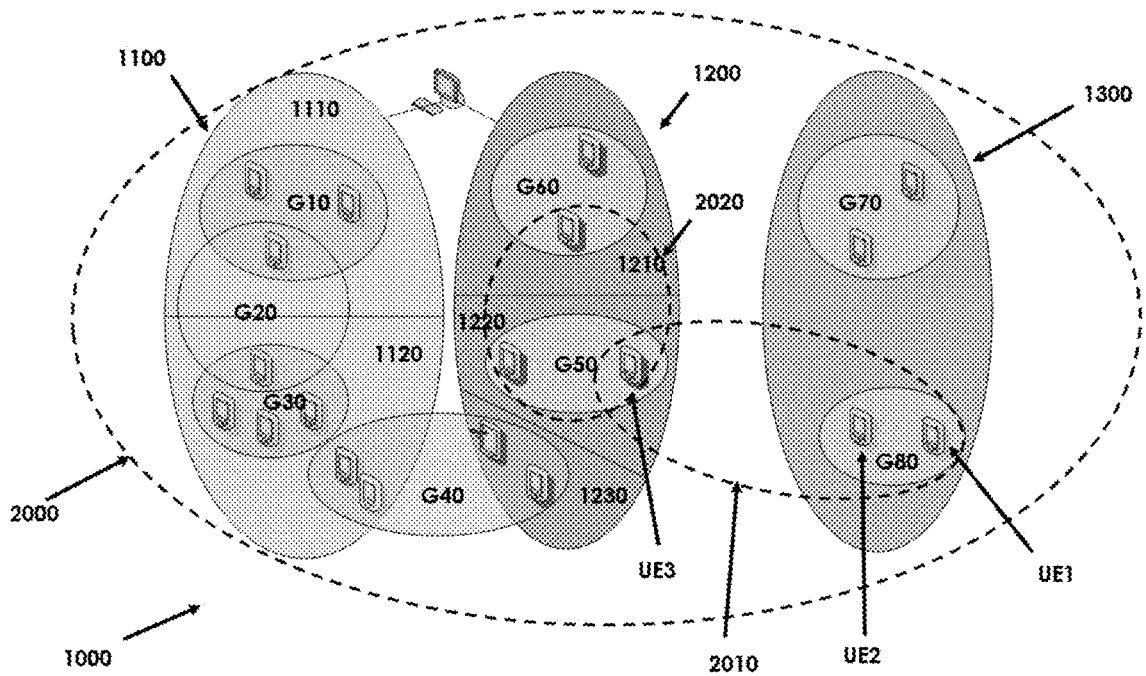
[Fig. 8]
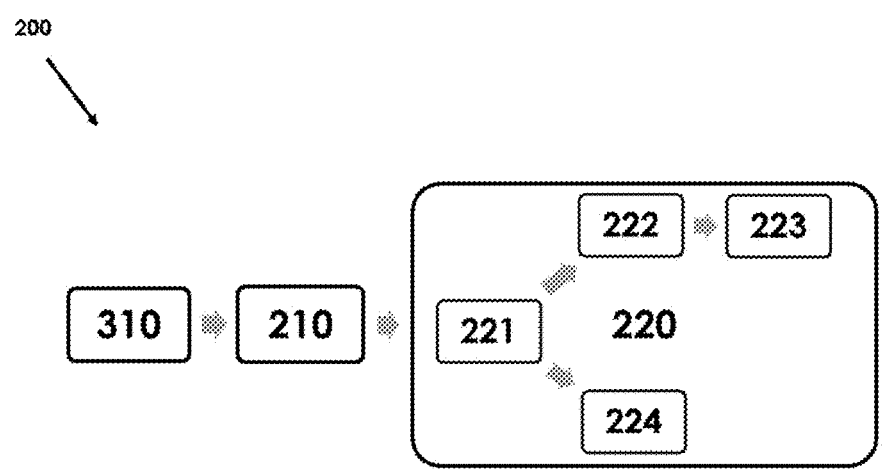

METHOD FOR SUPERVISING THE CONNECTION BETWEEN TWO NODES OF A COMMUNICATION NETWORK

CROSS-REFERENCE TO RELATED APPLICATIONS

This application claims priority to French Patent Application No. 1904393, filed Apr. 25, 2019, the entire content of which is incorporated herein by reference in its entirety.

FIELD

The technical field of the invention is that of communication networks and more particularly that of the supervision of the connection between two nodes of a communication network.

The present invention relates to a method for supervising the connection between two nodes of a communication network and more particularly between a client and a server or between two servers.

BACKGROUND

Communication networks operating according to the client-server model comprise a plurality of nodes of which some are clients and others servers. In these models, to establish communication between a client and a server, the clients are always initiators of the communication, by sending a request, and the servers recipients of the request. This is the case for example in web models, where a client wishing to consult a web page sends a request to a server, which in return supplies the requested web page. The communications being exclusively at the initiative of the client, the server does not need to ensure a correct state of the connection with the client.

"Correct state of the connection" is taken to mean a state of the connection, thus of the network link, between the client and the server enabling communication between the two entities, that is to say a state in which the server may reach the client.

In the 3GPP governing mobile networks of GSM (Global System for Mobile communications) type and more particularly in deployments resorting to critical communication services defined by the 3GPP called MCS (Mission Critical Services), it happens that the server is the initiator of the communication with a client.

FIG. 1 shows a schematic representation of a communication network of the prior art.

The communication network 100 represented in FIG. 1 is for example a network according to the 3GPP MCS standard. The communication network 100 comprises two clients C1 and C2 and two servers S1 and S2. "Communication network according to the 3GPP MCS standard" is taken to mean a communication network compatible with the 3GPP MCS standard and more particularly with the current version of the 3GPP which is version 15, with the preceding versions from version 13 and with the following versions integrating all the characteristics of the invention.

In the 3GPP MCS, when a client wishes to communicate with another client, it sends a request to a server. For example, when the client C1 wishes to communicate with the client C2, and when a communication session is already established, it sends a communication request to the server S1 in a step 1. The server S1, transmits the request to the server S2 in a step 2, either directly, or by going through one or more other servers (not represented). The server S2 then transmits the request to the client C2 in a step 3. Other cases exist where the server S2 initiates the communication with the client C2 according to the 3GPP MCS.

In such cases, the connection between the client C2 and the server S2 may have been lost, notably because any problem in the transport network leading to a cut of the service leads to a loss of connection between the client C2 and the server S2.

The 3GPP MCS standard does not describe means for supervising the connection between a client and a server, or between two servers, for example when a server is a "Controlling Server" and when the other server is a "Non-Controlling Server". This supervision is necessary to minimise loss of information due to the duration of the loss of connection. Indeed, in the case where the client is the initiator of the communication, it has knowledge of the loss of connection with the server, for example because it does not receive acknowledgement. On the other hand, when the server is the initiator of the communication with the client, the client has no means of knowing that the server has sought to communicate with it.

Solutions to this problem have been envisaged in the prior art, for example by sending periodic messages (also called "heartbeats"), using the "push" notifications proposed for example by mobile telephone operating systems, such as "APN" (Apple Push Notifications) of iOS® and "FCM" (Firebase Cloud Messaging) of Android®. "Push" notifications make it possible, in being sent periodically, to monitor the connection between client and server in the 3GPP MCS.

This solution is relevant for messaging applications, which are not periodic by definition. It is not however relevant for "real time" services for which the time for establishing the connection must be guaranteed. In addition, this solution is inaccessible when no Internet access is possible, for example when the network is deployed and closed, that is to say only accessible locally.

In addition, in the case of a private communication in "Push-To-Talk" (PTT) in "pre-arranged" mode as defined by the 3GPP MCS standard, the communication session between two communicating clients is only established when the user presses on the button of the user device. It is thus necessary to be able to monitor the connection between two nodes without a session being established between these nodes.

There thus exists a need to have a solution for monitoring the connection between two nodes of a network according to the client-server model in which the server may initiate a communication or instead in which the communication network is not connected to the Internet network, and independently of the fact that a communication session is established between the two nodes.

SUMMARY

An aspect of the invention offers a solution to the aforementioned problems, while enabling monitoring of the connection between two nodes of a communication network according to the client-server model in which the server may initiate the communication, the monitoring being able to be implemented independently of the connection of the communication network to the Internet network.

An aspect of the invention relates to a method for monitoring the connection between a first node and a second node of a communication network, wherein the method comprises:

A step of selecting a session established between the first node and the second node, the selected session becoming a monitoring session, A step of monitoring the connection between the first node and the second node via the monitoring session.

Thanks to the invention, it is possible to monitor the connection between two nodes of a communication network, the monitoring being able to be carried out by any of the two nodes. Indeed, the invention beneficially uses a session established between the two nodes to monitor the connection between the nodes. Thus, each of the two nodes has the possibility of monitoring the connection between them, since a session is still established between them. It is not even necessary that a communication session is established between the two nodes.

Apart from the characteristics that have been mentioned in the preceding paragraph, the monitoring method according to an aspect of the invention may have one or more complementary characteristics among the following, considered individually or according to all technically possible combinations thereof:

the step of monitoring the connection between the first node and the second node comprises:

A sub-step of periodically sending a message by the first node to the second node via the monitoring session, the period being defined by a period parameter in a memory of the first node and the second node, If the second node has not received the message in the period defined by the period parameter:

A sub-step of updating a counter of non-reception of the message by the second node, If the value of the non-reception counter is greater than the value of a non-reception threshold, a sub-step of detecting a loss of connection between the first node and the second node, If the second node has received the message within the period defined by the period parameter, a sub-step of re-setting the non-reception counter.

The communication network is a communication network according to the 3GPP MCS standard.

The monitoring method further comprises a preliminary step of establishing a group communication session in messaging mode between the first node and the second node, the session selected at the selection step then being the group communication session established in messaging mode.

The selected session is an emergency dedicated group session established in messaging mode and the message sent periodically is a floor control protocol message.

The selected session is a signalling dedicated group session established in messaging mode and the message sent periodically is a signalling message.

The selected session is a session of the first communication group established in messaging mode between the first node and the second node and the message sent periodically is a floor control protocol message.

When the communication group established between the first node and the second node of which a session has been selected as monitoring session is disaffiliated or deleted, the step of selecting a session is repeated.

When the second node has detected a loss of connection with the first node, the second node periodically sends a registration message to the first node.

The first node is a server and the second node is a client.

When loss of connection is detected, the second node announces to a user of the second node a loss of connection with the first node.

The first node is a server not controlling the monitoring session and the second node is a server controlling the monitoring session.

In addition, in an aspect of the invention, each node has in a memory the same period parameter, enabling each node to know the monitoring period, making the method reversible: one of the two nodes that is the recipient of the periodic messages may become the sender and vice versa for the other node.

Thanks to the invention, the node receiving the monitoring message may know the state of the connection between the two nodes. Thus, even when a server is the initiator of a communication, the client, receiving the monitoring messages originating from the server, may monitor the connection between the two nodes, and thus ensure that it is indeed connected to the server and that it may receive communication requests from the server.

Beneficially, the method may establish a monitoring session when no session is established between the two nodes. Indeed, it is possible that the two nodes are connected but that no session is established between them, for example in the case of the "pre-arranged" mode of the 3GPP MCS.

Beneficially, the method according to the invention may use an existing session between two nodes, for example a dedicated emergency group session in the 3GPP MCS, as monitoring session. The benefit of a dedicated emergency group session is that each of the two nodes is always affiliated to the dedicated emergency group, it is thus always possible to monitor the connection between the two nodes.

The method according to an embodiment of the invention may also use for example a communication session of a communication group established between two nodes. A drawback of communication groups is that a node may be disaffiliated therefrom or that the communication group may be deleted. The method according to an embodiment of the invention makes it possible to override this drawback by selecting another session of another communication group to which the two nodes are affiliated when one of the two nodes is disaffiliated from the first communication group or when the first communication group is deleted.

When a group communication or dedicated emergency group session is selected, the message periodically sent in the method according to an embodiment of the invention is beneficially a floor control protocol message (the protocol being called "Floor Control Protocol" in the 3GPP MCS standard and the floor control protocol message being called "Floor Idle" message), the method according to an embodiment of the invention beneficially taking advantage of the existing infrastructure of the communication network according to the 3GPP MCS standard.

The method according to an embodiment of the invention may also beneficially use a dedicated signalling group session, group not visible to the user of a user device and being able to be defined and identical for a set of users, not making it necessary to have a communication group session already established between the two nodes at the moment when it is wished to monitor the connection between the nodes.

The invention and the different applications thereof will be better understood on reading the description that follows and by examining the figures that accompany it.

BRIEF DESCRIPTION OF THE FIGURES

The figures are presented for indicative purposes and in no way limit the invention.

FIG. 1 shows a schematic representation of a communication network of the prior art.

FIG. 2 shows a schematic representation of the method according to an embodiment of the invention.

FIG. 3 shows a schematic representation of a communication network implementing the method of the invention according to a first embodiment.

FIG. 4 shows a schematic representation of a communication network implementing the method of the invention according to a second embodiment.

FIG. 5 shows a schematic representation of a communication network implementing the method of the invention according to a third embodiment.

FIG. 6 shows a schematic representation of a communication network comprising dedicated signalling groups.

FIG. 7 shows a schematic representation of a communication network comprising dedicated signalling groups.

FIG. 8 shows a schematic representation of the method according to an alternative of the invention.

DETAILED DESCRIPTION

The figures are presented for indicative purposes and in no way limit the invention.

Unless stated otherwise, a same element appearing in the different figures has a single reference.

FIG. 2 shows a schematic representation of the method according to the invention.

The method 200 according to a first embodiment of the invention represented in FIG. 2 comprises a step of selecting a monitoring session 210 and a step of monitoring the connection between the two nodes 220.

The monitoring method 200 according to the invention is a method for monitoring the connection between two nodes of a communication network. "Communication network" is taken to mean a network making it possible to access communication services, that is to say services linked to communication, for example access to audio, video or messaging with files for interacting with one or more user devices. The communication services make it possible to establish private communications between two user devices or group communications between user devices affiliated to a same multimedia group. The communication network to which are connected the two nodes is for example a communication network according to the 3GPP MCS standard. "Communication network according to the 3GPP MCS standard" is taken to mean a communication network compatible with the 3GPP MCS standard and more particularly with the current version of the 3GPP which is version 15, with the preceding versions from version 13 and with the following versions integrating all the characteristics of the invention.

"Multimedia group" is taken to mean a group encompassing several user devices being able to interact with each other once authenticated and registered with a server of the communication network enabling access to the multimedia group.

The communication network may be fixed, for example a communication network covering a company, or mobile, for example tactical, that is to say used in the case of a special forces mission.

The communication network comprises nodes. "Node" is taken to mean any device of the network. Thus, in a network according to the client-server model, a node may be a server or a client, for example a user device.

"Connection between two nodes" is taken to mean the network link between the two nodes of the network. Also, when the connection between two nodes is monitored, the correct state of the network link between the two nodes is ensured, that is to say that it is ensured that the two nodes of the network have the possibility of communicating.

"Session" is taken to mean a set of resources of the network reserved for an exchange between two nodes. For example, in the case of a communication session between two nodes, a set of resources is reserved for the communication between the two nodes. For example, in the case of a signalling session between two nodes, a set of resources is reserved for the signalling between the two nodes.

The first step of the method for monitoring 200 the connection between two nodes according to a first embodiment of the invention is a step 210 of selecting a monitoring session.

"Monitoring session" is taken to mean a session which, once selected, will be used to monitor the connection between the two nodes. This session is not necessarily only used to monitor the connection between two nodes.

In step 210, a monitoring session is selected. The selection is carried out by one of the two nodes, for example by a processor of the node (e.g. a processor comprising electronic circuitry), using a programme recorded for example in a memory of the node (e.g. a non-transitory memory). The node making the selection of the monitoring session is for example the node that will monitor the connection between the two nodes. The step of selecting 210 the session may also be carried out by an entity other than one of the two nodes of which the connection is to be monitored, for example by another node of the network, for example a network management device. According to an embodiment of the invention, several types of sessions may be selected.

The selected session is a session established between two nodes. A session selected as "monitoring session" may be a dedicated emergency group session, a group communication session, or instead a dedicated signalling group session.

FIG. 3 shows a schematic representation of a communication network 100 implementing the method of the invention according to a first embodiment.

The communication network 100 represented in FIG. 3 comprises three nodes: two servers S1 and S2 and a client C1. The connection to be monitored may be for example between the server S1 and the client C1, between the server S1 and the server S2 or instead between the server S2 and the client C1. FIG. 3 only represents the monitoring of the connection between the servers S1 and S2 and between the server S1 and the client C1.

A session selected in FIG. 3 as "monitoring session" for monitoring the connection between the client C1 and the server S1 is a session A of a dedicated emergency group EG established in "messaging" mode to which the client C1 is affiliated and of which the server S1 is an administrator. Another session selected in FIG. 3 as "monitoring session" for monitoring the connection between the servers S1 and S2 is a session B of a dedicated emergency group EG established in "messaging" mode for which the servers S1 and S2 are administrators.

A communication group is established according to two possible modes in the 3GPP MCS standard:
   either in "chat" mode: each user joins the group when he wishes to do so and is ready to participate at any moment in the group: if someone speaks, only those participating in the group hear, the other members of the group do not hear, the server does not establish sessions, or in "pre-arranged" mode: when a user asks to speak, the server only establishes the sessions at this moment with all the users of the group.

"Established in "messaging" mode" is taken to mean a session established in "chat" mode as described in the 3GPP MCS standard.

Thus, for example in the case where the communication network 100 follows the 3GPP MCS standard and comprises at least one dedicated emergency group established in "messaging" mode to which each of the two nodes are affiliated and in which a session is established between the two nodes, the session used for monitoring the connection between the two nodes is this session beneficially established between the two nodes throughout the presence of the nodes within the network.

In the case where the nodes are not affiliated to a same dedicated emergency group, or in the case where one at least of the nodes is not affiliated to any dedicated emergency group, or in any other case where it may be considered necessary, the session selected as "monitoring session" may be a communication group session established in "messaging" mode to which the two nodes are affiliated, the session being established between at least the two nodes.

FIG. 4 shows a schematic representation of a communication network 100 implementing the method of the invention according to a second embodiment.

The communication network 100 represented in FIG. 4 comprises three nodes: two servers S1 and S2 and a client C1. The connection to be monitored may be for example between the server S1 and the client C1, between the server S1 and the server S2 or instead between the server S2 and the client C1. FIG. 4 only represents the monitoring of the connection between the servers S1 and S2 and between the server S1 and the client C1.

A session selected in FIG. 4 as "monitoring session" for monitoring the connection between the client C1 and the server S1 is a session C of a communication group G1 established in "messaging" mode to which the client C1 is affiliated and of which the server S1 is administrator. Another session selected in FIG. 4 as "monitoring session" for monitoring the connection between the servers S1 and S2 is a session D of a communication group G4 established in "messaging" mode of which the servers S1 and S2 are administrators.

In the second embodiment, the selected session is for example the first session established between the two nodes of the first communication group to which the two nodes are affiliated. "First group" is taken to mean the first communication group established in "messaging" mode to which the two nodes have affiliated themselves, temporarily, and to which the two nodes are still affiliated. In FIG. 4, the first communication group established in "messaging" mode between the two client C1 and server S1 nodes is the communication group G1 and the first communication group established in "messaging" mode between the two communication server S1 and server S2 nodes is the communication group G4.

"First session" is taken to mean the first session to have been established between at least the two nodes, temporarily, and still being established between the two nodes. When one at least of the nodes is no longer affiliated to the communication group of which the session had been selected as "monitoring session", or when this communication group is deleted, the step of selecting 210 the monitoring session is reiterated. Thus, a session of a new communication group established in "messaging" mode is selected, the new communication group then being the first communication group established in "messaging" mode to which the two nodes have affiliated themselves, temporarily, and to which the two nodes are still affiliated, the former group no longer meeting the second criterion of affiliation of the two nodes to the group.

A session selected as "monitoring session" may be a dedicated signalling group session.

FIG. 5 shows a schematic representation of a communication network 100 implementing the method of the invention according to a third embodiment.

The communication network 100 represented in FIG. 5 comprises three nodes: two servers S1 and S2 and a client C1. The connection to be monitored may be for example between the server S1 and the client C1, between the server S1 and the server S2 or instead between the server S2 and the client C1. FIG. 5 only represents the monitoring of the connection between the servers S1 and S2 and between the server S1 and the client C1.

A session selected in FIG. 5 as "monitoring session" to monitor the connection between the client C1 and the server S1 is a session E of a signalling dedicated group SG established in "messaging" mode to which the client C1 and the server S1 are affiliated. Another session selected in FIG. 5 as "monitoring session" to monitor the connection between the servers S1 and S2 is a session F of a dedicated signalling group SG established in "messaging" mode to which the servers S1 and S2 are affiliated.

In the third embodiment, a dedicated signalling group is a group of user devices only enabling the transmission of signalling messages, for example control messages, announcement messages, or any other type of messages enabling the establishment of communications within the network and the management of the network.

Description of a Dedicated Signalling Group

The following paragraphs focus on describing a dedicated signalling group.

FIG. 6 shows a schematic representation of a communication network comprising dedicated signalling groups.

"Communication network" is taken to mean a network making it possible to access communication services, that is to say services linked to communication, for example access to audio, video or messaging with files to interact with one or more user devices. Communication services make it possible to establish private communications between two user devices or group communications between user devices affiliated to a same multimedia group.

"Multimedia group" is taken to mean a virtual group encompassing several user devices being able to interact with each other once authenticated via a server of the communication network enabling access to the multimedia group.

The communication network 1000 represented in FIG. 6 comprises a plurality of dedicated signalling groups. The communication network 1000 comprises a dedicated signalling group 2000 to which all the user devices of the communication network 1000 are affiliated. This makes it possible to announce the availability of services to all the user devices of the communication network 1000. The group being dedicated to signalling, it makes it possible not to have to create a communication group encompassing all the user devices of the network and thus to respect confidentiality rules and simplify the management of the communication network 1000.

The signalling groups 2000 and 2010 are created by an operator of the communication network 1000. A communication network 1000 may comprise several dedicated signalling groups. The operator(s) having created them may have made the choice to reflect the partitioning of the organisations 1100, 1200 and 1300, for example by creating a dedicated signalling group for each organisation 1100, 1200 and 1300, and by further creating a dedicated signalling group by sub-organisation 1110, 1120, 1210, 1220 and 1230. The operator may also create inter-organisational dedicated signalling groups such as the dedicated signalling group 2010.

Thus, the dedicated signalling groups make it possible to reflect the partitioning and the hierarchy of the organisations within which they are implemented, while respecting confidentiality criteria while not enabling communication between all the user devices of the communication network 1000.

The dedicated signalling groups are signalling data exchange groups. Thus they do not exchange media such as video or voice. For example, in the case of a communication network according to the 3GPP MCS standard, they are data exchange groups of "MCData" type. "Communication network according to the 3GPP MCS standard" is taken to mean a communication network compatible with the 3GPP MCS standard and more particularly with the current version of the 3GPP which is version 15, with the preceding versions from version 13 and with the following versions integrating all the characteristics of the signalling groups.

One or more user devices are affiliated to the dedicated signalling groups created by the operator, either by being affiliated implicitly as the 3GPP MCS standard allows, that is to say while being affiliated forcedly by the system governing the network, or by choosing to become affiliated to a dedicated signalling group. The user not having knowledge of the signalling groups to which he is affiliated, the user device chooses to affiliate itself or not to a dedicated signalling group, when the affiliation is not forced on it, by implementing, for example by a processor of the user device, an algorithm recorded in a memory of the user device.

The communication network may be fixed, for example a communication network covering a company, or mobile, for example tactical, that is to say used in the case of a special forces mission.

A user device UE1, UE2 and UE3 is for example a smartphone, a tablet, a portable computer or any other device making it possible to communicate within a network.

Group "dedicated to signalling" is taken to mean a group of user devices only enabling the transmission of signalling messages, for example control messages, service availability announcement messages, or any other type of messages enabling the establishment of communications within the network and the management of the network. The service availability announcement messages may be for example notifications.

The communication network 1000 comprises another dedicated signalling group 2010 comprising the user devices UE1 and UE2 affiliated to the communication group G80 and UE3 affiliated to the communication group G50.

The dedicated signalling groups 2010 make it possible to avoid the "silo effect" encountered when user devices are found in different organisations 1200 and 1300 and in different communication groups G50 and G80. Thanks to the dedicated signalling group 2010, the user devices UE1, UE2 and UE3 may receive signalling messages enabling for example the announcement of the availability of one or more services.

The signalling messages may be sent by the user devices of the communication network 1000, by a server of the network, by a supervisor device of the network or by any other device connected to the network.

A service availability announcement is sent to a dedicated signalling group or to several dedicated signalling groups.

These services may be any service that needs to be announced to the user device, such as for example services of emergency alert, imminent peril, private communication, multicast group communication, system communication, ambient viewing group and ambient listening group.

For example, in the case of so-called "legacy" services, that is to say services already existing for example in the 3GPP MCS standard, such as emergency and imminent peril alerts, the dedicated signalling groups make it possible to announce that one of the user devices of the dedicated signalling group is in distress or that a peril is imminent to several user devices which would not necessarily be affiliated to a same communication group.

In the case of private communications or multicast group communications, this may make it possible for example to announce that a call is underway and to propose to a user device to join the communication with user devices which are not necessarily in one of its communication groups. This makes it possible to announce the availability of a traditional service, that is to say already known, to several user devices not necessarily being in the same communication group.

Thus, in the case for example of a communication network within an airport, the users are designated by their profession (baggage handler, security agent, pilot, crew, fireman, etc.) and work on different flights throughout the day. The users choose their flight as a function of their flight planning. Each user must be able to communicate with all the other users having the same trade or the same flight, or having the same trade as said user on the same flight.

Thanks to the dedicated signalling groups, a service availability announcement may be sent to all the users having the same trade, having the same flight, or having the same trade and the same flight thanks to one or more parameters of the service availability announcement. This parameter may for example be a functional address. "Functional address" is taken to mean an identifier for example linked to a profession, such as a trade code, linked to a flight, such as a flight code or any other identifier making it possible to address a user device. This service availability announcement may announce the availability of a private communication or a group communication between all the users having the same trade and propose to each user having the same trade to join said private communication. Thus, even if users having the same trade were not part of the same communication group, they can join a group thanks to this announcement.

The announcement of availability of a private communication or a group communication may be sent to all the user devices, each user device then deciding, for example by means of an algorithm recorded in a memory and implemented by a processor of the user device, if it meets the criteria given by the parameter or parameters comprised in the service availability announcement and thus if it has to join the announced communication.

The dedicated signalling groups further enable announcements of availability of "new generation" services, such as multimedia services. For example, these services may be group ambient viewing and group ambient listening services, such as defined in the 3GPP MCS standard. Thanks to the invention, these services are no longer addressed individually to the user devices but it is possible to address a plurality of user devices.

A group ambient viewing service enables an operator device such as a "dispatcher", i.e. a fixed control room operator device making it possible to communicate with user devices and/or the management of the network, mainly from control rooms, to live access video streams from a user device. The user may or may not be informed of the reception of the video stream by the control room.

A group ambient listening service enables a control room operator device to live access the audio stream from a user device. The user may or may not be informed of the reception of the audio stream by the control room.

These two multimedia services may be announced to one or more user devices affiliated to one or more dedicated signalling groups from for example a fixed device or from another user device. The dedicated signalling groups beneficially make it possible to receive the audio and/or video stream from user devices thanks to signalling messages such as messages of announcement of availability of group ambient viewing or group ambient listening services. Thus, each user device receiving the service availability announcement, that is to say each user device affiliated to the group or dedicated signalling groups that are recipients of the announcement, may decide or not to use this announced service.

A user device decides to use a service either by processing the signalling message, received because it is affiliated to a dedicated signalling group that is a recipient of the signalling message, by an algorithm recorded in a memory and implemented by a processor, or by asking the user of the user device if he chooses to use the announced available service.

For example, in the case of a multicast group communication announced as available to a dedicated signalling group, the user devices affiliated to the dedicated signalling group may ask the user, for example by a message displayed on a screen of the user device, if the user wishes to join the multicast communication.

In another example, in the case of a group ambient viewing service, it may be desirable that the user does not know that the service is available and that the user device uses the announced available service, for example for discretionary reasons. In this case, the user device having at its disposal an embedded intelligence, for example an algorithm in an internal memory and implemented by a processor, decides by itself to use or not this service, for example as a function of parameters comprised in the service availability announcement.

The service availability announcement may comprise one or more parameters, making it possible to cross reference several parameters and thus to only address a certain number or a precise type of user devices.

For example, the service availability announcement may comprise a location parameter.

In the case of an emergency call service, the emergency call service announcement may comprise the location of the user device from which the emergency call has originated. This makes it possible to locate the user device from which the emergency call has originated and thus to locate the event.

The manner in which the user devices know and/or recover their location is not an object of the invention. This may be done in a manner known to those skilled in the art, for example from a GPS (Global Positioning System).

A service availability announcement comprising a location is sent to all the user devices of one or more dedicated signalling groups, whatever their location.

A user device receiving a service availability announcement comprising a location uses its embedded intelligence, for example an algorithm implemented by a processor registered in a memory, to decide if the service is available for it. The algorithm of the user device recovers for example its position and reads the location comprised in the service availability announcement. It then analyses if its position is close to the location comprised in the service availability announcement received.

It is understood that its position is "close" to the location comprised in the service availability announcement when the position of the user device is within a radius less than a predetermined value with respect to the location comprised in the service availability announcement. This predetermined radius may be recorded in a memory of the user device, for example configured by an operator, or may be comprised in the service availability announcement.

Thus, all the user devices affiliated to the dedicated signalling group will receive the service availability announcement via the dedicated signalling group encompassing for example firemen, the announcement comprising the location of the event. Only user devices situated in the location will then be able to use the service. This makes it possible for example in this case to announce the possibility of joining a multicast group conversation between firemen situated in the location where an event has occurred, or to announce the event only to users close to the position of the sender.

Concerning ambient group viewing or ambient group listening services, the location comprised in the service availability announcement is the location that the sender has targeted as being the zone that it wishes to see or listen to.

In a service availability announcement comprising a location, the location may be added either by the sender or by a device of the network such as a server.

The location comprised in a service availability announcement may make it possible to create a service zone. For example, when a user device enters into this zone, it may be notified of a service available in this zone.

This may be done in several ways. The system may detect that a user device has entered into the zone and automatically affiliated the user device to the dedicated signalling group linked to this zone. The manner in which the system detects that a user device has entered into the zone does not form part of the object of the invention. Once affiliated, the user device may receive the service availability announcement and use the announced service. Thus, a dedicated signalling group is associated with a location.

Another way may be to send periodically the service availability announcement to a plurality of user devices affiliated to dedicated signalling groups that already exist. Each user device then verifies periodically if it is within the zone of the service availability announcement and may then use the service if it is within the zone.

Another parameter which may be comprised in a service availability announcement is for example a hierarchy level parameter, for example the rights of the user, or a service linked parameter, for example the remaining amount of battery power of the user device if the service consumes battery power.

In the case of a persistent service, that is to say a service being able to be used for quite a long time, for example several hours or several days, the service availability announcements may be sent periodically, for example every minute or every hour. This enables a user device having affiliated itself recently to a dedicated signalling group to receive the service availability announcement even if it has only joined the dedicated signalling group after the first sending of the announcement.

FIG. 7 shows a schematic representation of a communication network comprising dedicated signalling groups.

In FIG. 7, a same user device UE3 is affiliated to several dedicated signalling groups 2000, 2010 and 2020.

All the user devices of the communication network 1000 are affiliated to the dedicated signalling group 2000. Thus, it is possible of announce an availability of service to all the user devices of the communication network 1000.

The user devices UE1, UE2 and UE3 are affiliated to the same dedicated signalling group 2010, making it possible to announce to them an availability of service even though they are not all in the same communication groups.

The user device UE3 is further affiliated to the dedicated signalling group 2020, making it possible to announce to it the availability of a service that the other user devices UE1 and UE2 of the dedicated signalling group 2010 are not authorised to use and/or cannot use.

This makes it possible to respect confidentiality criteria, while belonging to several dedicated signalling groups having different levels of confidentiality of the announced services, while not having group communication between certain user devices, for example between the user devices UE1 and UE3.

Thus, a benefit of signalling groups is that they make it possible to address a plurality of user devices and to address a restricted number of user devices as a function of the announced service and the needs, and thus a granularity of the announcements while avoiding the silo effect of communication groups and while respecting confidentiality criteria.

Remainder of the Description of the Third Embodiment of the Invention

The two nodes do not need to be affiliated to the same communication group or to the same dedicated emergency group. The selected session of the dedicated signalling group is beneficially a session established between two nodes through their duration of presence within the network. Thus, the monitoring of the connection between the two nodes by at least one of the two nodes is possible even before any communication session is established between them.

The method for monitoring 200 the connection between two nodes according to the first embodiment comprises a second step 220 of monitoring the connection between two nodes.

According to an embodiment of the invention, for each monitored connection between two nodes, each of the two nodes comprises in a memory a same period parameter. Thus, as represented in FIG. 5, the server S1 and the client C1 each comprise in a memory the same period parameter P1 enabling monitoring of the connection between the server S1 and the client C1. In the same way, the server S1 and the server S2 each comprise in a memory the same period parameter P2 enabling monitoring of the connection between the server S1 and the server S2. The server S1 thus comprises in a memory two period parameters P1 and P2 making it possible to monitor respectively the connections with the client C1 and with the server S2. The period parameters P1 and P2 may have equal or different values.

The period parameter is used during step 220 of the monitoring method 200 according to the invention. The step 220 comprises a plurality of sub-steps 221 to 224.

The step of monitoring 220 the connection between two nodes comprises a first sub-step 221 of periodic sending of a message by the first node to the second node via the monitoring session previously selected at step 210. The period of sending the message is defined by the period parameter in a memory of each of the two nodes of which the connection is monitored. The value of the period parameter is a period, for example set at 1 second. This signifies that a message will be sent every second.

This sub-step 221 of periodic sending of a message is carried out by the node not monitoring the connection. The node monitoring the connection is the recipient of the messages sent periodically by the node not monitoring the connection. For example, in a client-server model and in the case where one of the two nodes is a server and where the other of the two nodes is a client, the server may be the sender of periodic messages, the client being the recipient of these messages. In this embodiment, it is the client that monitors the connection between the client and the server, enabling the client to know the state of the connection between it and the server even if it is the server that initiates the communication between them.

The connection to be monitored may be the connection between two servers, for example between a server not controlling the monitoring session and a server controlling the monitoring session if the group of which a session is used for monitoring is a communication group, then the server controlling this group (called "controlling server") is that which plays the role of server, the other server playing the role of "client". In the case where the group of which a session is used for monitoring is a signalling group, one of the servers is elected to be the "server" for example by configuration, the other then playing the role of the "client"

In the first embodiment where the selected monitoring session is a dedicated emergency group session established in "messaging" mode, the message sent periodically is for example a floor control protocol message. Indeed, each node acting as server within a network respecting the 3GPP MCS standard comprises a floor control protocol module, the floor control module being configured to manage the floor during communication within a multimedia group to which the user devices are affiliated. Thus, in the first embodiment where the two nodes of which the connection is to be monitored are affiliated to a same dedicated emergency group, the message sent periodically is a message of the floor control protocol, the invention beneficially using a mechanism already implemented in existing 3GPP MCS networks.

In the second embodiment where the selected monitoring session is a group communication session, the message sent periodically is also for example a floor control protocol message.

In the third embodiment where the selected monitoring session is a dedicated signalling group session, the message sent periodically is for example a signalling message.

In the case where the second node has not received the periodic message within the period defined by the period parameter, a sub-step 222 of updating a non-reception counter is carried out. The sub-step 222 is carried out by the second node, that is to say by the node that is the recipient of the message sent periodically, that is to say the node monitoring the connection. The sub-step 222 comprises the updating of a non-reception counter, the non-reception counter being in a memory of the second node. The updating of the non-reception counter comprises for example its incrementation. For example, the non-reception counter is initialised at a value of 0, and incremented by 1 each time that a message is not received within the time period defined by the period parameter common to the two nodes.

When the value of the non-reception counter is greater than the value of a non-reception threshold, a sub-step 223 of detecting a loss of connection between the first node and the second node is carried out. The non-reception threshold is recorded in the memory of the second node that is the recipient of the messages sent periodically. This threshold may for example have a value of 15. Thus, when the value of the non-reception counter in the memory of the second node exceeds this non-reception threshold, for example while having a value of 16, the sub-step 223 of detecting a loss of connection between the first node and the second node is carried out.

This sub-step 223 of detecting a loss of connection between the first node and the second node comprises the detection of a loss of connection between the first node and the second node, for example by modification in the memory of the node detecting the loss of connection, for example by the client in the case of monitoring of a client-server connection, of a loss of connection parameter, the loss of connection parameter having for example a value of 0 when no loss of connection is detected, and a value of 1 when a loss of connection is detected, as long as the connection is not established. This parameter is re-set when the connection is established. The sub-step 223 of detecting a loss of connection between the first node and the second node may further comprise, when the second node is a user device, an announcement to a user of the second node of a loss of connection with the first node. This announcement may comprise for example the display on a screen of the second node the loss of connection with the first node, an audible announcement sent by the second node, a vibration of the second node, or any other means of announcing a loss of connection to the user of the second node. When the second node is a server, the sub-step 223 of detecting a loss of connection between the first node and the second node may further comprise an alarm sent to the network supervision system.

In the case where the second node has indeed received the periodic message within the period defined by the period parameter, a sub-step 224 of re-setting the non-reception counter is carried out, the non-reception counter being in a memory of the second node. The sub-step 224 is carried out by the second node, that is to say by the node that is the recipient of the message sent periodically, that is to say the node monitoring the connection. The sub-step 224 of re-setting the non-reception counter comprises re-setting the non-reception counter to an initial value, for example to a value of 0, indicating that a periodic message has been received.

FIG. 8 shows a schematic representation of the method according to an alternative of the invention.

In the alternative presented in FIG. 8, the method 200 comprises a preliminary step 310 of establishment of a monitoring session.

Indeed, in the case where it is desired to monitor the connection between two nodes but when it is not desired or when it is impossible to use an existing session as monitoring session, it is possible to establish a group communication session between the two nodes which will then be selected at step 210, becoming the monitoring session. This establishment may be carried out for example by the creation of a communication group and by the implicit affiliation by the system managing the network 100 of the two nodes concerned to the communication group created, in "messaging" mode of the 3GPP MCS standard. It is also possible to use an existing communication group and to establish the session between the two nodes.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

The invention claimed is:

1. A method for monitoring a connection between a first node server and a second node client of a communication network, comprising:
    selecting a session established between the first node server and the second node client, the selected session becoming a monitoring session,
    monitoring the connection between the first node server and the second node client via the monitoring session, wherein the monitoring of the connection between the first node server and the second node client comprises:
        a sub-step of periodic sending of a message by the first node server to the second node client via the monitoring session, a period being defined by a period of the periodic sending parameter in a memory of the first node server and the second node client, and
        when the second node client has not received the message within the period defined by the period parameter:
            a sub-step of updating a counter of non-reception of the message by the second node client, and
            when a value of the non-reception counter is greater than a value of a non-reception threshold, a sub-step of detecting a loss of connection between the first node server and the second node client,
        when the second node client has received the message within the period defined by the period parameter, a sub-step of re-setting the non-reception counter.

2. The method for monitoring according to claim 1, further comprising a preliminary step of establishing a group communication session in messaging mode between the first node server and the second node client, the session selected at the selecting then being the group communication session established in messaging mode.

3. The method for monitoring according to claim 1, wherein the selected session is a dedicated emergency group session established in messaging mode and the message sent periodically is a floor control protocol message.

4. The method for monitoring according to claim 1, wherein the selected session is a dedicated signalling group session established in messaging mode and the message sent periodically is a signalling message.

5. The method for monitoring according to claim 2, wherein the selected session is a session of the communication group established in messaging mode between the first node server and the second node client and the message sent periodically is a floor control protocol message.

6. The method for monitoring according to claim 2, wherein, when the communication group session established between the first node server and the second node client of which a session has been selected as monitoring session is withdrawn or deleted, the selecting of a session is repeated.

7. The method for monitoring according to claim 1, wherein, when the second node client has detected a loss of connection with the first node server, the second node client periodically sends a registration message to the first node server.

8. The method for monitoring according to claim 1, wherein, when a loss of connection is detected, the second node client announces to a user of the second node client the loss of connection with the first node server.

9. The method for monitoring according to claim 1, wherein the first node server is a server not controlling the monitoring session and the second node client is a server controlling the monitoring session.

* * * * *